(No Model.)
H. A. BUCHANAN & J. M. TISDAL.
CANOPY FOR VEHICLES, &c.
No. 581,691. Patented May 4, 1897.
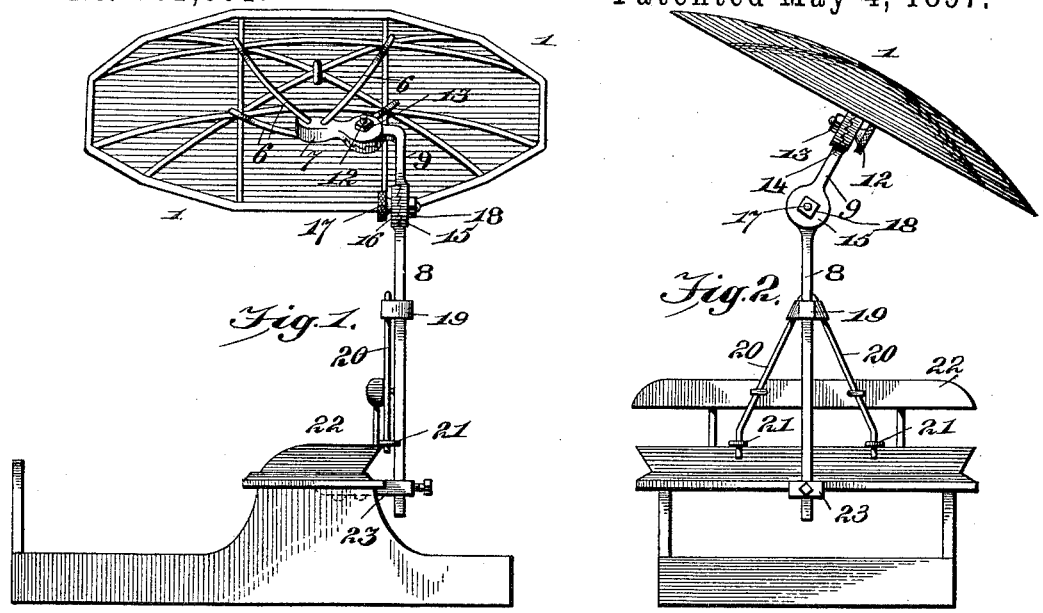
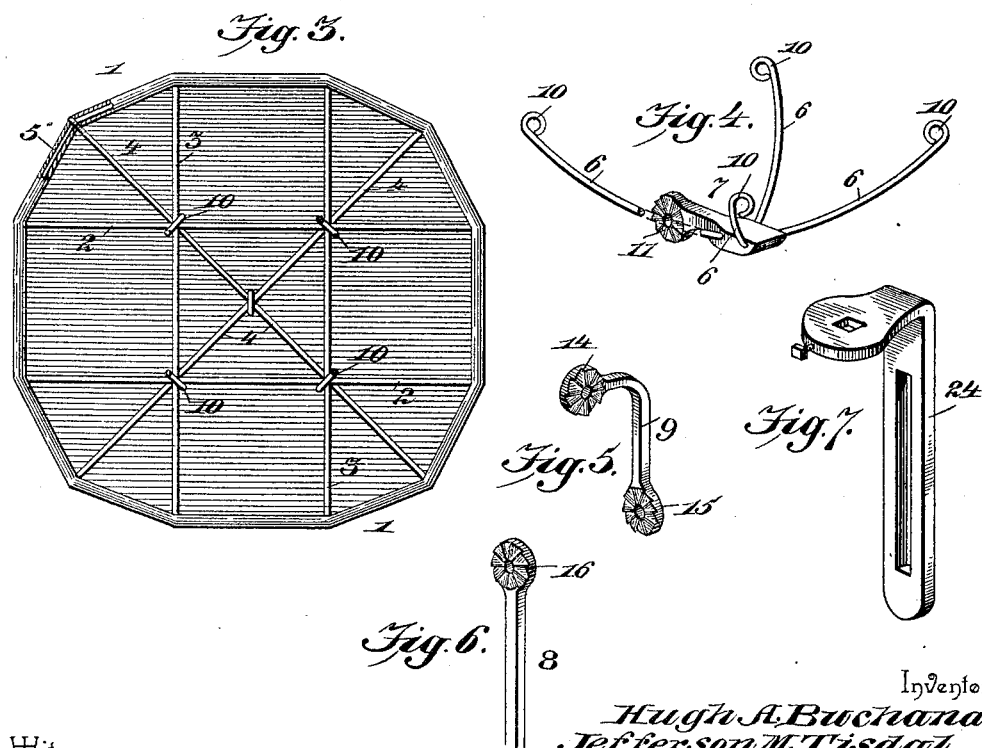
Witnesses
H. G. Dieterich
J. F. Riley
Inventors
Hugh A. Buchanan
Jefferson M. Tisdal
By their Attorneys,
C. A. Snow & Co.

UNITED STATES PATENT OFFICE.

HUGH A. BUCHANAN AND JEFFERSON M. TISDAL, OF FERRIS, TEXAS.

CANOPY FOR VEHICLES, &c.

SPECIFICATION forming part of Letters Patent No. 581,691, dated May 4, 1897.

Application filed December 10, 1896. Serial No. 615,148. (No model.)

*To all whom it may concern:*

Be it known that we, HUGH A. BUCHANAN and JEFFERSON M. TISDAL, citizens of the United States, residing at Ferris, in the county of Ellis and State of Texas, have invented a new and useful Canopy for Vehicles, &c., of which the following is a specification.

The invention relates to improvements in canopies for vehicles, &c.

The object of the present invention is to improve the construction of canopies and to provide a simple, inexpensive, and efficient one adapted to be readily mounted on all kinds of vehicles, plows, machines, &c., where shade or protection from the weather is desirable.

Another object of the invention is to provide a canopy which may be readily tilted forward or backward and to the right and left in order to afford the proper protection.

The invention consists in the construction and novel combination and arrangement of parts hereinafter fully described, illustrated in the accompanying drawings, and pointed out in the claims hereto appended.

In the drawings, Figure 1 is a side elevation of a canopy constructed in accordance with this invention and shown applied to a vehicle. Fig. 2 is a rear elevation of the same. Fig. 3 is a reverse plan view of the canopy, illustrating the arrangement of the ribs. Fig. 4 is a detail perspective view of the bracket which supports the canopy. Fig. 5 is a similar view of the L-shaped connecting-bar. Fig. 6 is a detail view of the upper portion of the standard. Fig. 7 is a detail view of the seat-bracket for mounting the standard on a plow, mower, or similar machine.

Like numerals of reference designate corresponding parts in all the figures of the drawings.

1 designates a canopy, which is preferably elliptical, as shown, and which consists of a suitable fabric covering and longitudinal, transverse, and diagonal ribs 2, 3, and 4. The longitudinal and transverse ribs are arranged in pairs, and all the ribs are suitably secured together at the points of intersection. The outer ends of the ribs are provided with suitable eyes or perforations, through which are passed a marginal wire 5, and the edge of the covering is secured thereto.

The canopy is secured to arms 6 of a bracket 7, which is disposed horizontally when the canopy is in a horizontal position and which is connected with a standard 8 by means of an L-shaped connecting-bar 9. The arms 6, which are disposed diagonally with relation to the canopy, are rigid and curve upward and are provided at their upper ends with eyes 10, that embrace the longitudinal, transverse, and diagonal ribs at their points of intersection. The opposite arms 6 are preferably constructed of a single piece of metal passing through an opening of the bracket and centrally secured to the same in any suitable manner.

The bracket extends rearward from the lower terminals of the arms, which are rigidly secured to it, and is provided at its rear end with a perforation and an annular series of ratchet-teeth 11, disposed around the perforation, which receives an adjusting screw or bolt 12. The adjusting screw or bolt 12 is provided with a suitable nut 13, and it secures the upper end of the L-shaped connecting-bar to the bracket. The upper end 14 of the L-shaped connecting-bar 9 is provided with teeth, corresponding with those of the bracket and adapted to interlock therewith, whereby the canopy is rigidly secured at the desired adjustment.

The lower end 15 of the connecting-bar 9 is provided with a perforation and an annular series of ratchet-teeth, and the upper end 16 of the standard has corresponding teeth and a central perforation. A bolt or screw 17 passes through the standard and the lower end of the connecting-bar and is provided with a nut 18, which locks the ratchet-teeth of those parts in engagement with each other.

The standard is mounted in an eye 19 of an inverted-V-shaped support 20 and in an eye of a horizontal arm 21. The inverted-V-shaped support is mounted on the back of a vehicle-seat 22, and the horizontal arm is secured to the lower face of the same and is provided with a clamping-screw 23, which engages the standard and secures the canopy at the desired vertical adjustment.

The ratchet connections at the ends of the L-shaped connecting-bar enable the canopy to be tilted backward and forward and to right and left in order to position it properly to shield the driver.

When it is desired to mount a canopy on a plow, mower, or similar machine, a bracket 24 is employed and is secured to the back of the seat of such plow or mower. The bracket is provided in its stem or shank with a longitudinal slot, and it has an opening in its arm for the reception of the standard. A set-screw is mounted on the arm of the seat of the bracket and is adapted to engage the standard to secure the canopy at the desired adjustment.

It will be seen that the canopy is simple and comparatively inexpensive in construction, that it is strong and durable, and that it is adapted to be readily mounted on a vehicle, plow, mower, or the like.

It will also be seen that the canopy is capable of ready adjustment to tilt it forward, backward, or to the right or left in order to position it properly for shielding the driver.

What we claim is—

1. In a device of the class described, the combination of a canopy composed of a cover, and supporting-ribs intersecting one another at different points, and a bracket provided with rigid arms extending upward and terminating in eyes embracing and connecting the ribs at the points of intersection, substantially as described.

2. In a device of the class described, the combination of a canopy, a bracket supporting the canopy, the inverted-V-shaped support designed to be secured to the back of the seat and provided at its apex with an eye, the horizontal arm capable of longitudinal adjustment and provided with an opening, a vertical standard passing through the eye of the support and the opening of the arm, a clamping device for securing the standard in its vertical adjustment, and connections between the standard and the bracket whereby the canopy is adjusted, substantially as described.

3. In a device of the class described, the combination of a canopy composed of a cover, and the longitudinal, transverse and diagonal ribs crossing one another and supporting the cover, and a bracket provided with rigid upwardly-extending arms having eyes at their upper terminals embracing and connecting the said ribs at their points of intersection, substantially as described.

In testimony that we claim the foregoing as our own we have hereto affixed our signatures in the presence of two witnesses.

HUGH A. BUCHANAN.
JEFFERSON M. TISDAL.

Witnesses:
J. C. BLAKENEY,
E. W. MUNSEY.